United States Patent [19]

Andrä et al.

[11] Patent Number: 4,613,117

[45] Date of Patent: Sep. 23, 1986

[54] ENGINE BEARING WHICH HAS HYDRAULIC DAMPING

[75] Inventors: Rainer Andrä, Limburg; Manfred Hofmann, Hünfelden, both of Fed. Rep. of Germany

[73] Assignee: Metzeler Kautschuk GmbH, Munich, Fed. Rep. of Germany

[21] Appl. No.: 657,737

[22] Filed: Oct. 4, 1984

[30] Foreign Application Priority Data

Oct. 5, 1983 [DE] Fed. Rep. of Germany ....... 3336204

[51] Int. Cl.⁴ .............................................. F16F 9/08
[52] U.S. Cl. .................................. 267/140.1; 248/580
[58] Field of Search ................... 248/580; 267/140.1, 267/141, 141.1, 141.2, 141.3, 141.4, 141.5

[56] References Cited

U.S. PATENT DOCUMENTS

| 2,507,227 | 5/1950 | Skinner | 267/140.1 |
| 2,555,347 | 6/1951 | Lee | 267/140.1 |
| 4,187,573 | 2/1980 | Fyfe et al. | 248/580 |

FOREIGN PATENT DOCUMENTS

| 527275 | 5/1955 | Italy | 267/141.3 |
| 149436 | 11/1980 | Japan | 267/140.1 |
| 811748 | 4/1959 | United Kingdom | 267/140.1 |

*Primary Examiner*—Duane A. Reger
*Attorney, Agent, or Firm*—Herbert L. Lerner; Laurence A. Greenberg

[57] ABSTRACT

The present invention relates to an engine bearing in particular for motor vehicles which has hydraulic damping and at least one chamber which is filled with liquid and has an approximately conically-shaped, rubber elastic peripheral wall which acts as a bearing spring, the front face of which chamber is sealed by a bearing plate. The present invention provides that the bearing plate has a thrust element on its upper surface, which thrust element is rigid in the axial direction in comparison with the bearing spring and accomodates the mounting and has adjustable radial rigidity to independently set the axial and radial rigidity.

3 Claims, 3 Drawing Figures

ENGINE BEARING WHICH HAS HYDRAULIC DAMPING

The present invention relates to an engine bearing in particular for motor vehicles, which has hydraulic damping and at least one chamber which is filled with liquid and has an approximately conically-shaped, rubber-elastic peripheral wall, the face of which chamber is sealed by a bearing plate.

Engine bearings of this type are known, by way of example, from DE-OS No. 30 27 742. In bearings of this type, the spring excursion of the bearing plate which supports the engine is determined in the axial direction, that is, for the most part, in the vertical direction, and in the radial direction by the shape and the chosen material of the rubber-elastic bearing spring in the chamber wall between the bearing plate and the mounting which is fixed to the body work. This means that the axial and radial rigidity of these bearings is coupled. On account of the dynamically balanced structure of bearings of this type and the relatively high spring excursions, in comparison with conventional engine bearings, ratios of radial rigidity to axial rigidity of $>1$ are presently used.

As is known from the use of conventional bearings, substantially smaller ratios are required, that is the radial rigidity often has to be less than the axial rigidity. Moreover, the radial rigidity should be adjustable independently of the axial rigidity. In hydraulic damped engine bearings, it is only possibly to modify this rigidity ratio by modifying the angle of the bearing spring, that is to say by modifying the cone angle thereof—a very costly measure.

An object of the present invention is to provide a hydraulically damped engine bearing which has a substantially reduced radial rigidity and in which the radial rigidity may be easily set independently of the axial rigidity.

The present invention achieves this object by providing the bearing plate with a thrust element on its upper side, which element is rigid in an axial direction, in comparison with the bearing spring, and has adjustable radial rigidity and accomodates the mounting.

The thrust element effectively comprises a cylindrical mounting plate which is vulcanized onto the upper side of the bearing plate, with the interposition of an elastomer layer.

It is, however, also possible for the bearing plate to have an approximately cylindrical recess on its upper side, into which recess is vulcanized a cylindrical mounting plate, as a thrust element, which has a smaller diameter than the cylindrical recess, with the interposition of an elastomer layer.

A further possibility is for the bearing plate to be ring-shaped and for a cylindrical mounting plate having a cylindrical lug which projects into the inner recess of the bearing plate and has a smaller diameter than the recess to be vulcanized on as a thrust element, with the interposition of an elastomer layer. The elastomer layer may thus cover the inner periphery of the ring-shaped bearing plate in such a way that a circular, free annular gap is left between this layer and the cylindrical lug.

By integrating a thrust element of this type into conventional, hydraulically damped engine bearings, the radial rigidity may be set independently of the axial rigidity and may be varied by a simple modification to the structure.

The structure and mode of operation of embodiments of the present invention are described in more detail with reference to diagrammatic drawings.

Figure 1:
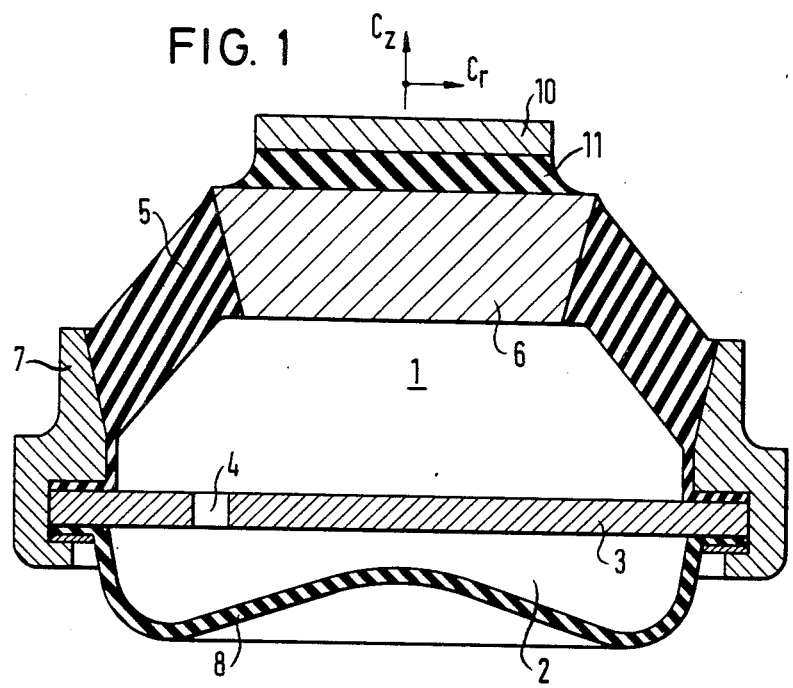
FIG. 1 shows a cross-section through an engine bearing of this type which has a thrust element vulcanized thereon.

The present invention is explained in FIG. 1 with reference to a conventional two chamber engine bearing which has hydraulic damping; it would, however, also be possible to use it with hydraulically damped bearings which are constructed differently. As can be seen from FIG. 1, the engine bearing essentially comprises an upper chamber 1 and a lower chamber 2, which are separated from each other by a separating plate 3 which has a choking point 4. The upper chamber 1 is formed, in this instance, by a thick-walled, hollow, conical chamber wall 5 of rubber elastic material, which acts essentially as a bearing spring. The upper face of the chamber wall is sealed by a bearing plate 6 and is connected in an adhesive manner at the bottom to a supporting flange 7 as a connection to an abutment which is not shown in detail. The lower chamber 3 is formed by a chamber wall 8 which may be, for example, cupshaped and is also of rubber elastic material, and is also connected in an adhesive manner to the flange 7.

This bearing has a certain axial rigidity $C_z$ and a certain radial rigidity $C_r$ in the horizontal direction to counter stresses imposed in the z-direction by an engine which is, for example, directly connected to the bearing plate 6. The size and ratio of axial rigidity $C_z$ to radial rigidity $C_r$ are determined in bearings of this type by the shape and material of the chamber wall 5, so that both rigidity values are governed by this chamber wall 5 which acts as a bearing spring. On account of the relatively large spring excursion and the dynamically balanced structure of bearings of this type, only ratios of $C_r$: $C_z$ of $>1$ may be used. It is known from conventional engine bearings that the ratio of $C_r$:$C_z$ of $>1$ is often required transversely to the direction of movement, and this can only be achieved with difficulty in bearings of the above-mentioned construction.

However, in order to maintain an independently adjustable radial rigidity $C_r$, a cylindrical mounting plate 10, which can support the mounting elements which are not shown in detail and are, for example, in the form of a bolt, is vulcanized onto the bearing plate 6 with the interposition of a more or less thick elastomic layer 11, as can be seen from FIG. 1. By an appropriate choice of the diameter of the mounting plate 10 and the thickness and the material of the elastomer layer 11, the radial rigidity of the bearing can be set independently of the axial rigidity of the bearing using straight-forward means and within broad limits. Elements 10 and 11 together form a thrust element.

Figure 2:
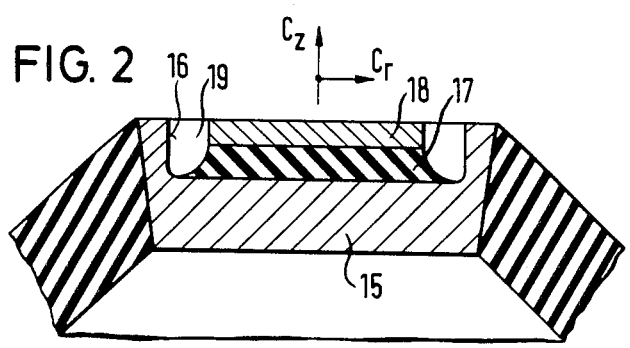
FIG. 2 shows a section through the upper bearing plate which has an integrated thrust element.

A further possible embodiment is shown in FIG. 2. According to FIG. 2, the bearing plate 15 has an almost cylindrical recess 16 on its upper side into which recess a mounting plate 18 is vulcanized via an elastomer layer 17. This mounting plate 18 has a smaller diameter than the recess 16, thus leaving an annular gap 19 between the outer periphery of the mounting plate 18 and the recess 16, and thereby on the one hand permitting radial movement and on the other hand permitting the wall of the recess 16 to act as a stop for radial movements of the mounting plate 18 which are too great.

Figure 3:
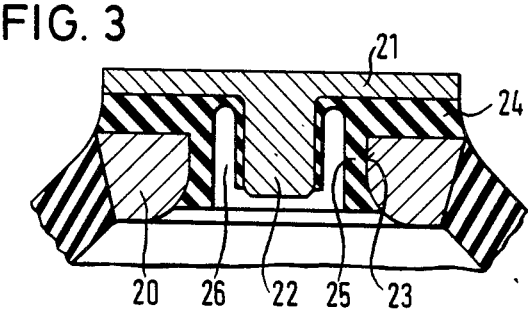
FIG. 3 shows a further embodiment which has a ring-shaped bearing plate and a thrust element vulcanized therein.

A further possibility for the design of a thrust element of this type is shown in FIG. 3. The bearing plate 20 in FIG. 3 is annular, while the cylindrical mounting plate 21 has a cylindrical lug 22 which projects into the recess 23 of the annular bearing plate 20. The mounting plate 21 is vulcanized directly onto the upper side of the bearing plate 20 via an elastomer layer 24. This elastomer layer effectively also covers the wall of the recess 23 and optionally the surface of the cylindrical lug 22, a free annular gap 26 being left, however, between the portion 25 which covers the recess 23 and the cylindrical lug 22, which gap also allows the mounting plate 21 to move radially.

By choosing a suitable material for the elastomer layers 11, 17 and 24 respectively and a suitable thickness, the radial rigidity $C_r$ of these bearings may be to a large extent arbitarily set and set in particular independently of the axial rigidity $C_z$. By minimal modifications to the construction, adaptations can be made to values which are desired in each case. The elastomer layers in each case are only stressed on account of the free periphery of the mounting plate 10 according to FIG. 1 and the annular gaps 19 and 26 of the embodiments according to FIGS. 2 and 3 respectively, the outer limits of this annular gap acting as a stop for lateral movements of the mounting plate.

Only a few examples of possible constructive designs of thrust elements of this type are shown in the drawings. Other constructions are of course also possible in relation to the present invention in so far as they make use of the principle of the present invention.

We claim:

1. Engine bearing with hydraulic damping for supporting mounting elements, comprising at least one liquidfilled chamber having a substantially conical peripheral wall, said peripheral wall being formed of rubber-elastic material forming a bearing spring, a bearing plate closing a front face of said chamber, said bearing plate being annular defining an open recess therein with a given diameter, and a thrust element with adjustable radial rigidity vulcanized to said bearing plate for supporting the mounting elements, said thrust element including a cylindrical mounting plate having a cylindrical lug with a diameter smaller than said given diameter projecting into said inner recess and into said chamber, and an elastomer layer disposed between said lug and said bearing plate in said inner recess, vulcanizing said lug to said bearing plate.

2. Engine bearing according to claim 1, wherein said elastomer layer includes a portion covering the interior periphery of said annular bearing plate and being spaced from said lug, defining a circular, open annular gap between said portion and said cylindrical lug.

3. Engine bearing with hydraulic damping for supporting mounting elements, comprising at least one liquid-filled chamber having a substantially conical peripheral wall, said peripheral wall being formed of rubber-elastic material forming a bearing spring, a separating plate disposed below said chamber, another liquid-filled chamber disposed below said separating plate and communicating with said first-mentioned chamber through a choking location formed in said separating plate, a bearing plate closing a front frace of said first-mentioned chamber, said bearing plate being annular defining an open recess therein with a given diameter, and a thrust element with adjustable radial rigidity vulcanized to said bearing plate for supporting the mounting elements, said thrust element including a cylindrical mounting plate having a cylindrical lug with a diameter smaller than said given diameter projecting into said inner recess and into said first-mentioned chamber, and an elastomer layer disposed between said lug and said bearing plate in said inner recess, vulcanizing said lug to said bearing plate.

* * * * *